United States Patent
Hubauer

(10) Patent No.: US 12,373,708 B2
(45) Date of Patent: Jul. 29, 2025

(54) PROCESSES AND PRODUCTS FOR GENERATION OF COMPLETION RULES OF KNOWLEDGE GRAPHS

(71) Applicant: Siemens Aktiengesellschaft, Munich (DE)

(72) Inventor: Thomas Hubauer, Garching bei Munchen (DE)

(73) Assignee: Siemens Aktiengesellschaft, Munich (DE)

( * ) Notice: Subject to any disclaimer, the term of this patent is extended or adjusted under 35 U.S.C. 154(b) by 947 days.

(21) Appl. No.: 17/483,219

(22) Filed: Sep. 23, 2021

(65) Prior Publication Data
US 2022/0101153 A1  Mar. 31, 2022

(30) Foreign Application Priority Data
Sep. 30, 2020  (EP) ..................... 20199233

(51) Int. Cl.
*G06N 5/025* (2023.01)
*G06F 16/36* (2019.01)
*G06N 20/00* (2019.01)

(52) U.S. Cl.
CPC ........... *G06N 5/025* (2013.01); *G06F 16/367* (2019.01); *G06N 20/00* (2019.01)

(58) Field of Classification Search
CPC ....... G06N 5/025; G06N 20/00; G06F 16/367
See application file for complete search history.

(56) References Cited

U.S. PATENT DOCUMENTS

| | | | |
|---|---|---|---|
| 2015/0310195 A1* | 10/2015 | Bailor | G06F 21/45 726/6 |
| 2016/0224637 A1* | 8/2016 | Sukumar | G06F 16/2465 |
| 2018/0234385 A1* | 8/2018 | O'Neil | H04L 63/20 |
| 2019/0354544 A1* | 11/2019 | Hertz | G06N 5/025 |
| 2020/0265060 A1* | 8/2020 | Crapo | G06N 3/044 |
| 2021/0103256 A1* | 4/2021 | Jia | G06F 40/10 |
| 2021/0216881 A1* | 7/2021 | McCarthy | G06F 18/22 |

FOREIGN PATENT DOCUMENTS

CN  110147450 A  8/2019

OTHER PUBLICATIONS

Wikipedia Article, "Semantic Web", https://en.wikipedia.org/wiki/Semantic_Web.
Wikipedia Article, "Knowledge graph", https://en.wikipedia.org/wiki/Knowledge_graph.
Wikipedia Article, "Ontology (information science)", https://en.wikipedia.org/wiki/Ontology_(information_science).
(Continued)

*Primary Examiner* — Beau D Spratt
(74) *Attorney, Agent, or Firm* — Schmeiser, Olsen & Watts, LLP

(57) ABSTRACT

Provided is a computer-implemented technology which generates rules for completion of a knowledge graph by producing, with a generic machine learning model or one that is trained on the knowledge graph, inferred triples, optionally refines and filters the produced rules along predefined user settings and provides the resulting rules, along with the inferred facts covered by the rules, as candidates for completion of the knowledge graph.

20 Claims, 1 Drawing Sheet

(56) References Cited

OTHER PUBLICATIONS

Figure 1:
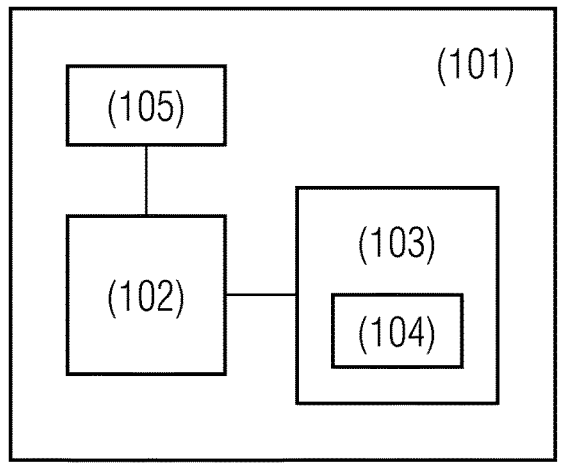

Wikipedia Article, "Markup language", https://en.wikipedia.org/wiki/Markup_language.
Wikipedia Article, "HTML", https://en.wikipedia.org/wiki/HTML.
Wikipedia Article, "XML", https://en.wikipedia.org/wiki/XML.
Wikipedia Article,"Web Ontology Language", https://en.wikipedia.org/wiki/Web_Ontology_Language.
Wikipedia Article, "Semantic reasoner", https://en.wikipedia.org/wiki/Semantic_reasoner.
Wikipedia Article, "Giant Global Graph", https://en.wikipedia.org/wiki/Giant_Global_Graph.
Wikipedia Article,"Machine learning", https://en.wikipedia.org/wiki/Machine_learning.
Wikipedia Article, "XHTML", https://en.wikipedia.org/wiki/XHTML.
Wikipedia Article, "Resource Description Framework", https://en.wikipedia.org/wiki/Resource_Description_Framework.
Wikipedia Article, "RDF query language", https://en.wikipedia.org/wiki/RDF_query_language.
Wikipedia Article, "SPARQL", https://en.wikipedia.org/wiki/SPARQL.
Wiharja, Kemas et al.; "Schema aware iterative Knowledge Graph completion"; Journal of Web Semantics; vol. 65; Sep. 29, 2020 (Sep. 29, 2020); XP086378359; ISSN: 1570-8268; DOI: 10.1016/J.WEBSEM.2020.100616.
Tran Hai, Dang et al; "Towards Nonmonotonic Relational Learning from Knowledge Graphs"; Inductive Logic Programming. ILP 2016. Lecture Notes in Computer Science; vol. 10326; No. 558; Jul. 16, 2017 (Jul. 16, 2017); pp. 94-107; XP047420381; DOI: 10.1007/978-3-319-63342-8_8; ISBN: 978-3-642-17318-9.
Woensel, William Van et al; "A Cross-Platform Benchmark Framework for Mobile Semantic Web Reasoning Engines"; The Semantic Web—ISWC 2014. Lecture Notes in Computer Science; vol. 8796; No. 558; Oct. 19, 2014 (Oct. 19, 2014); pp. 389-408; XP047301269; DOI: 10.1007/978-3-319-11964-9_25; ISBN: 978-3-642-17318-9.
Corcoglioniti, Francesco et al; "Frame-Based Ontology Population with Pikes"; IEEE Transactions on Knowledge and Data Engineering; vol. 28; No. 12; Aug. 24, 2016 (Aug. 24, 2016); pp. 3261-3275; XP011633325; ISSN: 1041-4347.
Hees, Jörn et al; "An Evolutionary Algorithm to Learn SPARQL Queries for Source-Target-Pairs"; Knowledge Engineering and Knowledgemanagement. EKAW 2016. Lecture Notes in Computer Science; vol. 10024; No. 558; Nov. 4, 2016 (Nov. 4, 2016); pp. 337-352; XP047361973; ISBN: 978-3-642-17318-9.
Wikipedia Article, "World Wide Web", https://en.wikipedia.org/wiki/World_Wide_Web.

* cited by examiner

PROCESSES AND PRODUCTS FOR GENERATION OF COMPLETION RULES OF KNOWLEDGE GRAPHS

CROSS-REFERENCE TO RELATED APPLICATIONS

This application claims priority to EP Application No. 20199233.6, having a filing date of Sep. 30, 2020, the entire contents of which are hereby incorporated by reference.

FIELD OF TECHNOLOGY

The following relates to processes and products for completion of knowledge graphs.

BACKGROUND

The World Wide Web (WWW), commonly known as the Web and invented by English scientist Tim Berners-Lee in 1989, is an information system where documents and other web resources are identified by Uniform Resource Locators (URLs, such as https://example.com/), which may be interlinked by hypertext, and are accessible over the Internet. The resources of the Web are transferred via the Hypertext Transfer Protocol (HTTP) and may be accessed by users by a software application called a web browser and are published by a software application called a web server.

https://en.wikipedia.org/wiki/World_Wide_Web

The Semantic Web is an extension of the World Wide Web (WWW) through standards set by the World Wide Web Consortium (W3C). The goal of the Semantic Web is to make Internet data machine-readable. To enable the encoding of semantics with the data, technologies such as Resource Description Framework (RDF) and Web Ontology Language (OWL) are used. These technologies are used to formally represent metadata. These standards promote common data formats and exchange protocols on the Web, fundamentally the RDF. According to the W3C, "The Semantic Web provides a common framework that allows data to be shared and reused across application, enterprise, and community boundaries." The Semantic Web is therefore regarded as an integrator across different content and information applications and systems. The term was coined by Tim Berners-Lee for a web of data (or data web) that can be processed by machines—that is, one in which much of the meaning is machine-readable. Tim Berners-Lee originally expressed his vision of the Semantic Web in 1999 as follows: "I have a dream for the Web [in which computers] become capable of analyzing all the data on the Web—the content, links, and transactions between people and computers. A "Semantic Web", which makes this possible, has yet to emerge, but when it does, the day-to-day mechanisms of trade, bureaucracy and our daily lives will be handled by machines talking to machines. The "intelligent agents" people have touted for ages will finally materialize." In 2006, Berners-Lee and colleagues stated that: "This simple idea . . . remains largely unrealized".

https://en.wikipedia.org/wiki/Semantic_Web

A Knowledge Graph is a knowledge base that uses a graph-structured data model or topology to integrate knowledge and data. Knowledge graphs are often used to store interlinked descriptions of entities—real-world objects, events, situations or abstract concepts—with free-form semantics, not fitting into a single traditional ontology. Since the development of the Semantic Web, knowledge graphs are often associated with linked open data projects, focusing on the connections between concepts and entities. They are also prominently associated with and used by search engines such as Google, Bing, and Yahoo; knowledge-engines and question-answering services such as WolframAlpha, Apple's Siri, and Amazon Alexa; and social networks such as LinkedIn and Facebook.

https://en.wikipedia.org/wiki/Knowledge_graph

Ontologies attempt to represent entities, ideas and events, with all their interdependent properties and relations, according to a system of categories. In computer science and information science, an ontology encompasses a representation, formal naming and definition of the categories, properties and relations between the concepts, data and entities that substantiate one, many or all domains of discourse. More simply, an ontology is a way of showing the properties of a subject area and how they are related, by defining a set of concepts and categories that represent the subject. For example, ontology can describe concepts, relationships between entities, and categories of things. These embedded semantics offer significant advantages such as reasoning over data and operating with heterogeneous data sources.

https://en.wikipedia.org/wiki/Ontology_(information_science)

In computer text processing, a markup language is a system for annotating a document in a way that is syntactically distinguishable from the text, meaning when the document is processed for display, the markup language is not shown, and is only used to format the text. The idea and terminology evolved from "marking up" paper manuscripts by revision instructions which are traditionally written by editors with a red or blue pencil on authors' manuscripts. Such "markup" typically includes both content corrections (such as spelling, punctuation, or movement of content), and also typographic instructions, such as to make a heading larger or boldface. In digital media, this "blue pencil instruction text" are replaced by tags which ideally indicate what the parts of the document are, rather than details of how they might be shown on some display. This lets authors avoid formatting every instance of the same kind of thing redundantly (and possibly inconsistently). It also avoids the specification of fonts and dimensions which may not apply to many users (such as those with different-size displays, impaired vision and screen-reading software). Early markup systems typically included typesetting instructions, as troff, TeX and LaTeX do, while Scribe and most modern markup systems name components, and later process those names to apply formatting or other processing, as in the case of XML. Some markup languages, such as the widely used HTML, have pre-defined presentation semantics—meaning that their specification prescribes some aspects of how to present the structured data on particular media. HTML, like DocBook, Open eBook, JATS and countless others, is a specific application of the markup meta-languages SGML and XML. That is, SGML and XML enable users to specify particular schemas, which determine just what elements, attributes, and other features are permitted, and where. One important characteristic of most markup languages is that they allow mixing markup directly into text streams. This happens frequently in documents: A few words in a sentence must be emphasized, or identified as a proper name, defined term, or other special item.

https://en.wikipedia.org/wiki/Markup_language

Hypertext Markup Language (HTML) is the standard markup language for documents designed to be displayed in a web browser. It can be assisted by technologies such as Cascading Style Sheets (CSS) and scripting languages such as JavaScript. Web browsers receive HTML documents from a web server or from local storage and render the documents into multimedia web pages. HTML describes the structure of a web page semantically and originally included cues for the appearance of the document. HTML elements are the building blocks of HTML pages. With HTML constructs, images and other objects such as interactive forms may be embedded into the rendered page. HTML provides a means to create structured documents by denoting structural semantics for text such as headings, paragraphs, lists, links, quotes and other items. HTML elements are delineated by tags, written using angle brackets. Tags such as <img/> and <input/> directly introduce content into the page. Other tags such as <p> surround and provide information about document text and may include other tags as sub-elements. Browsers do not display the HTML tags but use them to interpret the content of the page. HTML can embed programs written in a scripting language such as JavaScript, which affects the behavior and content of web pages. Inclusion of CSS defines the look and layout of content.

https://en.wikipedia.org/wiki/HTML

Extensible Markup Language (XML) is a markup language that defines a set of rules for encoding documents in a format that is both human-readable and machine-readable. The design goals of XML emphasize simplicity, generality, and usability across the Internet. It is a textual data format with strong support of Unicode for different human languages. Although the design of XML focuses on documents, the language is widely used for the representation of arbitrary data structures such as those used in web services. Several schema systems exist to aid in the definition of XML-based languages. Many application programming interfaces (APIs) exist to aid the processing of XML data.

A huge number of document formats using XML syntax have been developed, including RSS, Atom, SOAP, SVG, and XHTML. XML-based formats have become the default for many office-productivity tools, including Microsoft Office (Office Open XML), OpenOffice.org and LibreOffice (OpenDocument), or Apple's iWork. XML also provides the base language for communication protocols such as XMPP. Applications for the Microsoft .NET Framework use XML files for configuration, and property lists are an implementation of configuration storage built on XML. Many industry data standards, such as Health Level 7, OpenTravel Alliance, FpML, MISMO, and National Information Exchange Model are based on XML and the rich features of the XML schema specification. Key constructs most often encountered in day-to-day use comprise:

Character—An XML document is a string of characters. Almost every legal Unicode character may appear in an XML document.

Markup and content—The characters making up an XML document are divided into markup and content, which may be distinguished by the application of simple syntactic rules. Generally, strings that constitute markup either begin with the character < and end with a >, or they begin with the character & and end with a ;. Strings of characters that are not markup are content. However, in a CDATA (character data) section, the delimiters <![CDATA[and]]> are classified as markup, while the text between them is classified as content. In addition, whitespace before and after the outermost element is classified as markup.

Tag—A markup construct that begins with < and ends with >. Tags come in three flavors:
start-tag, such as <section>;
end-tag, such as </section>;
empty-element tag, such as <line-break/>.

Element—A logical document component that either begins with a start-tag and ends with a matching end-tag or consists only of an empty-element tag. The characters between the start-tag and end-tag, if any, are the element's content, and may contain markup, including other elements, which are called child elements. An example is <greeting>Hello, world!</greeting>. Another is <line-break/>.

Attribute—A markup construct consisting of a name-value pair that exists within a start-tag or empty-element tag. An example is <img src="madonna.jpg" alt="Madonna"/>, where the names of the attributes are "src" and "alt", and their values are "madonna.jpg" and "Madonna" respectively. Another example is <step number="3">Connect A to B.</step>, where the name of the attribute is "number" and its value is "3". An XML attribute can only have a single value and each attribute can appear at most once on each element. In the common situation where a list of multiple values is desired, this must be done by encoding the list into a well-formed XML attribute with some format beyond what XML defines itself. Usually this is either a comma or semi-colon delimited list or, if the individual values are known not to contain spaces, a space-delimited list can be used. For example, <div class="inner greeting-box">Welcome!</div>, where the attribute "class" has both the value "inner greeting-box" and also indicates the two CSS class names "inner" and "greeting-box".

XML declaration—XML documents may begin with an XML declaration that describes some information about themselves. An example is <?xml version="1.0" encoding="UTF-8"?>.

https://en.wikipedia.org/wiki/XML

Extensible HyperText Markup Language (XHTML) is part of the family of XML markup languages. It mirrors or extends versions of the widely used HyperText Markup Language (HTML). While HTML, prior to HTML5, was defined as an application of Standard Generalized Markup Language (SGML), a flexible markup language framework, XHTML is an application of XML, a more restrictive subset of SGML. XHTML documents are well-formed and may therefore be parsed using standard XML parsers, unlike HTML, which requires a lenient HTML-specific parser. XHTML 1.0 became a World Wide Web Consortium (W3C) recommendation on Jan. 26, 2000. XHTML 1.1 became a W3C recommendation on May 31, 2001. The standard known as XHTML5 is being developed as an XML adaptation of the HTML5 specification https://en.wikipedia.org/wiki/XHTML The Resource Description Framework (RDF) is a family of World Wide Web Consortium (W3C) specifications originally designed as a metadata data model. It has come to be used as a general method for conceptual description or modeling of information that is implemented in web resources, using a variety of syntax notations and data serialization formats. It is also used in knowledge management applications. The RDF data model is similar to classical conceptual modeling approaches (such as entity-relationship or class diagrams).

It is based on the idea of making statements about resources (in particular web resources) in expressions of the form subject-predicate-object, known as triples. The subject denotes the resource. The predicate denotes traits or aspects of the resource and expresses a relationship between the subject and the object.

For example, one way to represent the notion "The sky has the color blue" in RDF is as a triple:
- a subject denoting "the sky",
- a predicate denoting "has the color", and
- an object denoting "blue".

Therefore, RDF uses subject instead of object (or entity) in contrast to the typical approach of an entity-attribute-value model in object-oriented design: entity (sky), attribute (color), and value (blue).

RDF is an abstract model with several serialization formats (i.e. file formats), so the particular encoding for resources or triples varies from format to format. A collection of RDF statements intrinsically represents a labeled, directed multi-graph. In theory, this makes an RDF data model better suited to certain kinds of knowledge representation than are other relational or ontological models. In practice, RDF data is often stored in relational database or native representations (also called Triplestores—or Quad stores, if context such as the named graph is also stored for each RDF triple)
    https://en.wikipedia.org/wiki/Resource_
        Description_Framework RDFa (Resource Description Framework in Attributes) is a W3C Recommendation that adds a set of attribute-level extensions to HTML, XHTML and various XML-based document types for embedding rich metadata within Web documents. The RDF data-model mapping enables its use for embedding RDF subject-predicate-object expressions within XHTML documents. It also enables the extraction of RDF model triples by compliant user agents. The RDFa community runs under http://www.rdfa.info a wiki website to host tools, examples, and tutorials.

The purpose of RDFa is to provide a way to add metadata to any XML-based language. In October 2008 RDFa 1.0 reached recommendation status. RDFa 1.1 reached recommendation status in June 2012. It differs from RDFa 1.0 in that it no longer relies on the XML-specific namespace (xmlns) mechanism. Therefore, it is possible to use RDFa 1.1 with non-XML document types such as HTML 4 or HTML 5. Details can be found in an appendix to HTML 5. An additional RDFa 1.1 Primer document was updated 17 Mar. 2015.

The essence of RDFa is to provide a set of attributes that can be used to carry metadata in an XML language. These attributes are:
- about—a URI (Uniform Resource Identifier) or CURIE (Compact URI) specifying the resource the metadata is about
- rel and rev—specifying a relationship and reverse-relationship with another resource, respectively
- src, href and resource—specifying a partner resource
- property—specifying a property for the content of an element or the partner resource
- content—optional attribute that overrides the content of the element when using the property attribute
- datatype—optional attribute that specifies the datatype of text specified for use with the property attribute
- typeof—optional attribute that specifies the RDF type(s) of the subject or the partner resource (the resource that the metadata is about).

There are several "principles of interoperable metadata" met by RDFa:
- Publisher Independence—each site can use its own standards
- Data Reuse—data are not duplicated. Separate XML and HTML sections are not required for the same content.
- Self Containment—the HTML and the RDF are separated
- Schema Modularity—the attributes are reusable Additionally, RDFa may benefit web accessibility as more information is available to assistive technology.

There is a growing number of tools for better usage of RDFa vocabularies and RDFa annotation. Examples for Web-based RDFa editors are: RDFaCE (RDFa Content Editor), a WYSIWYM (What You See Is What You Mean) editor based on TinyMCE to support RDFa content authoring supporting manual and semi-automatic generation of RDFa with the support of annotation services such as DBpedia Spotlight, OpenCalais, Alchemy API, among others; RDFaCE-Lite, a version of RDFaCE also supporting Microdata and available as a WordPress plugin. An example for a Desktop RDFa editor is AutôMeta, an environment for semi-automatic (or automatic) annotation of documents for publishing on the Web using RDFa, also including a RDFa extraction tool to provide the user with a view of the annotated triples and supporting CLI (Command-Line Interface) and GUI (Graphical User Interface) interfaces.

An example of adding Dublin Core metadata (data elements typically added to a book or article like e.g. title, author, subject) as XML namespace (xmlns) to an XML element in an XHTML file which allows the passages and words within a text to be associated with semantic markup, is a follows:

```
<div xmlns:dc="http://purl.org/dc/elements/1.1/"
        about="http://www.example.com/books/wikinomics">
    In his latest book
    <span property="dc:title">Wikinomics</span>,
    <span property="dc:creator">Don Tapscott</span>
    explains deep changes in technology,
    demographics and business.
    The book is due to be published in
    <span property="dc:date" content="2006-10-01">2006</span>.
</div>
```

An example of a complete XHTML+RDFa 1.0 document which uses Dublin Core and FOAF (Fried of a Friend), an ontology for describing people and their relationships with other people and things, is a follows:

```
<?xml version="1.0" encoding="UTF-8"?>
<!DOCTYPE html PUBLIC "-//W3C//DTD XHTML+RDFa 1.0//EN"
        "http://www.w3.org/MarkUp/DTD/xhtml-rdfa-1.dtd">
<html xmlns="http://www.w3.org/1999/xhtml"
        xmlns:foaf="http://xmlns.com/foaf/0.1/"
        xmlns:dc="http://purl.org/dc/elements/1.1/"
        version="XHTML+RDFa 1.0" xml:lang="en">
    <head>
        <title>John's Home Page</title>
        <base href="http://example.org/john-d/" />
        <metaproperty="dc:creator" content="Jonathan Doe" />
        <link rel="foaf:primaryTopic"
                href="http://example.org/john-d/#me" />
    </head>
    <body about="http://example.org/john-d/#me">
        <h1>John's Home Page</h1>
        <p>My name is
        <span property="foaf:nick">John D</span>
        and I like
        <a href="http://www.neubauten.org/" rel="foaf:interest"
                xml:lang="de">Einstürzende Neubauten</a>.
        </p>
        <p>My
        <span rel="foaf:interest" resource="urn:ISBN:0752820907">
            favorite book is the inspiring
            <span about="urn:ISBN:0752820907">
                <cite property="dc:title">Weaving the Web</cite> by
                <span property="dc:creator">Tim Berners-Lee
            </span>
```

In the example above, the document URI can be seen as representing an HTML document, but the document URI plus the "#me" string http://example.org/john-d/#me represents the actual person, as distinct from a document about it. The foaf:primaryTopic in the header provides a URI of the person the document is about. The foaf:nick property in the first span element contains a nickname for this person, and the dc:creator property in the meta element describes who created the document. The hyperlink to the Einstürzende Neubauten website contains rel="foaf:interest", suggesting that John Doe is interested in this band. The URI of their website is a resource. The foaf:interest inside the second p element is referring to a book by ISBN number. The resource attribute defines a resource in a similar way to the href attribute, but without defining a hyperlink. Further into the paragraph, a span element containing an about attribute defines the book as another resource to specify metadata about. The book title and author are defined within the contents of this tag using the dc:title and dc:creator properties.

The above document corresponds to the following triples when automatically converted to RDF/XML:

```
<?xml version="1.0" encoding="UTF-8"?>
<rdf:RDF xmlns:rdf="http://www.w3.org/1999/02/22-rdf-syntax-ns#"
        xmlns:foaf="http://xmlns.com/foaf/0.1/"
        xmlns:dc="http://purl.org/dc/elements/1.1/">
    <rdf:Description rdf:about="http://example.org/john-d/">
        <dc:creator xml:lang="en">Jonathan Doe</dc:creator>
        <foaf:primaryTopic>
            <rdf:Description rdf:about=
                "http://example.org/john-d/#me">
                <foaf:nick xml:lang="en">John D</foaf:nick>
                <foaf:interest
                    rdf:resource="http://www.neubauten.org/"/>
                <foaf:interest>
                    <rdf:Description
                        rdf:about="urn:ISBN:0752820907">
                        <dc:creator xml:lang="en">Tim Berners-Lee
                        </dc:creator>
                        <dc:title xml:lang="en">Weaving the Web
                        </dc:title>
                    </rdf:Description>
                </foaf:interest>
            </rdf:Description>
        </foaf:primaryTopic>
    </rdf:Description>
</rdf:RDF>
```

Likewise, the above example can be expressed without XML namespaces in HTML5+RDFa 1.1 as follows whereby the prefix foaf is used without declaration as RDFa 1.1 automatically includes prefixes for popular vocabularies such as FOAF:

```
<html prefix="dc: http://purl.org/dc/elements/1.1/" lang="en">
    <head>
        <title>John's Home Page</title>
        <link rel="profile"
            href="http://www.w3.org/1999/xhtml/vocab" />
        <base href="http://example.org/john-d/" />
        <metaproperty="dc:creator" content="Jonathan Doe" />
        <link rel="foaf:primaryTopic"
            href="http://example.org/john-d/#me" />
    </head>
    <body about="http://example.org/john-d/#me">
        <h1>John's Home Page</h1>
        <p>My name is <span property="foaf:nick">John D</span>
        and I like <a href="http://www.neubauten.org/"
        rel="foaf:interest" lang="de">Einstürzende Neubauten</a>.
        </p>
        <p>My
            <span rel="foaf:interest" resource="urn:ISBN:0752820907">
                favorite book is the inspiring
                <span about="urn:ISBN:0752820907">
                    <cite property="dc:title">Weaving the Web</cite> by
                    <span property="dc:creator">Tim Berners-Lee
                    </span>
                </span>
            </span>.
        </p>
    </body>
</html>
https://en.wikipedia.org/wiki/RDFa
```

A RDF query language is a computer language, specifically a query language for databases, able to retrieve and manipulate data stored in Resource Description Framework (RDF) format. SPARQL has emerged as the standard RDF query language, and in 2008 became a W3C recommendation. Properties relevant to RDF query language design include support for the RDF format:

Support for RDF data, which is a collection of triples that form the RDF graph

Support for RDF semantics and inference that allows for entailment, the reasoning about the meaning of RDF graphs Support for schema data types, such as XML, schema and for desirable language features:

Expressiveness: the power of query expression that may be constructed

Closure: data operations on an RDF graph should result in another RDF graph

Orthogonality: data operations are independent of the context in which they are used Safety: every expression returns a finite set of results.

RDF query languages can be grouped into language families, each family comprising a set of closely related languages.

The SPARQL family of languages includes SquishQL, RDQL, SPARQL, and TriQL. These languages treat RDF data stores as triple stores that do not necessarily have ontology or schema information associated with them. Members of the SPARQL family are considered relational query languages because they have relational or pattern-based operations. SquishQL is a language constructed to be easy to use and similar in structure to SQL. RDQL (RDF Data Query Language), a further development of SquishQL, is intended to be a simple low level RDF language. SPARQL is an extension of RDQL that supports extraction of RDF subgraphs. In 2008, SPARQL 1.0 became a W3C recommendation and SPARQL 1.1 became a W3C recommendation in 2013.

The RQL family of languages includes RQL, SeRQL, and eRQL. These languages support querying of both data and schema. RQL (RDF Query Language), which uses types defined in RDF schemas (RDFS) to query the schema class hierarchy and to support data querying by type, is considered more expressive than the SPARQL family of languages. SeRQL and eRQL are simplified alternatives to RQL.

There is a family of RDF query languages inspired by XML query technology. XQuery for RDF uses the XML query language XQuery to query RDF data by serializing RDF into an XML format and then using XQuery on the result; this is also called the "syntactic web approach". TreeHugger and RDF Twig use XSLT to query RDF data. Versa by 4Suite is a query language that is inspired by)(Path.

There exist RDF query languages based on other principles. Metalog combines querying with reasoning and has an English like syntax. Algae is a query language developed by the W3C that adds reactive rules, also called actions, that determine for instance whether an Algae expression is a data query or a data update.

A sample query may be as follows:

```
select
    ?uri, ?name, ?lat, ?lon
from
    <http://swordfish.rdfweb.org/discovery/2003/11/cities/xmlrdf.jsp?query=port>
where
    (?city, <rdfs:label>, ?uri),
    (?city, <rdfs:label>, ?name),
    (?city, <pos:lat> , ?lat),
    (?city, <pos:long>, ?lon)
using
    rdfs FOR <http://www.w3.org/2000/01/rdf-schema#>,
    pos FOR <http://www.w3.org/2003/01/geo/wgs84_pos#>
```

Other languages which can query RDF data may include:
DQL, XML-based, queries and results expressed in DAML+OIL
XUL has a template element in which to declare rules for matching data in RDF. XUL uses RDF extensively for databinding.
Adenine (programming language written in RDF).
XQuery, or XML Query, is a standard query language for XML documents. Graph query languages, such as Cypher Query Language, GraphQL, and Gremlin, are designed to query graph databases, of which RDF data stores are an example. The Topic Map Query Language (TMQL) is a query language for topic maps, a data representation similar to but more general than RDF.
https://en.wikipedia.org/wiki/RDF_query_language
SPARQL, a recursive acronym for SPARQL Protocol and RDF Query Language, is a RDF query language—that is, a semantic query language for database—able to retrieve and manipulate data stored in Resource Description Framework (RDF) format. It was made a standard by the RDF Data Access Working Group (DAWG) of the World Wide Web Consortium (W3C) and is recognized as one of the key technologies of the semantic web. SPARQL 1.0 was acknowledged by W3C in January, 2008 as an official recommendation, and SPARQL 1.1 in March, 2013. SPARQL allows for a query to consist of triple patterns, conjunctions, disjunctions, and optional patterns. There exist tools that allow one to connect and semi-automatically construct a SPARQL query for a SPARQL endpoint, for example ViziQuer. In addition, tools exist to translate SPARQL queries to other query languages, for example to SQL and to XQuery.

SPARQL allows users to write queries against what can loosely be called "key-value" data or, more specifically, data that follow the RDF specification of the W3C. Thus, the entire database is a set of "subject-predicate-object" triples. This is analogous to some NoSQL databases' usage of the term "document-key-value", such as MongoDB.

In SQL relational database terms, RDF data can also be considered a table with three columns—the subject column, the predicate column, and the object column. The subject in RDF is analogous to an entity in a SQL database, where the data elements (or fields) for a given business object are placed in multiple columns, sometimes spread across more than one table, and identified by a unique key. In RDF, those fields are instead represented as separate predicate/object rows sharing the same subject, often the same unique key, with the predicate being analogous to the column name and the object the actual data. Unlike relational databases, the object column is heterogeneous: the per-cell data type is usually implied (or specified in the ontology) by the predicate value. Also, unlike SQL, RDF can have multiple entries per predicate; for instance, one could have multiple "child" entries for a single "person", and can return collections of such objects, like "children".

SPARQL provides a full set of analytic query operations such as JOIN, SORT, AGGREGATE for data whose schema is intrinsically part of the data rather than requiring a separate schema definition. However, schema information (the ontology) is often provided externally, to allow joining of different datasets unambiguously. In addition, SPARQL provides specific graph traversal syntax for data that can be thought of as a graph.

The example below demonstrates a simple query that leverages the ontology definition foaf ("friend of a friend"). Specifically, the following query returns names and emails of every person in the dataset:

```
PREFIX foaf: <http://xmlns.com/foaf/0.1/>
SELECT ?name
         ?email
WHERE
{
    ?person a   foaf:Person .
    ?person foaf:name ?name .
    ?person foaf:mbox ?email .
}
```

This query joins together all of the triples with a matching subject, where the type predicate, "a", is a person (foaf: Person), and the person has one or more names (foaf: name) and mailboxes (foaf:mbox).

In this example the reference to the subject uses the variable name "?person" for readable clarity. Since the first element of the triple is always the subject, one could have just as easily used any variable name, such as "?subj" or "?x". Whatever name is chosen, it must be the same on each line of the query to signify that the query engine is to join triples with the same subject.

The result of the join is a set of rows—?person, ?name, ?email. This query returns the ?name and ?email because ?person is often a complex URI rather than a human-friendly string. As any ?person may have multiple mailboxes, a ?name row may appear multiple times in the returned set, once for each mailbox.

This query can be distributed to multiple SPARQL endpoints (services that accept SPARQL queries and return results), computed, and results gathered, a procedure known as federated query.

Whether in a federated manner or locally, additional triple definitions in the query could allow joins to different subject types, such as automobiles, to allow simple queries, for example, to return a list of names and emails for people who drive automobiles with a high fuel efficiency.

In the case of queries that read data from the database, the SPARQL language specifies four different query variations for different purposes:
1) SELECT query, used to extract raw values from a SPARQL endpoint, the results are returned in a table format.
2) CONSTRUCT query, used to extract information from the SPARQL endpoint and transform the results into valid RDF.
3) ASK query, used to provide a simple True/False result for a query on a SPARQL endpoint.
4) DESCRIBE query, used to extract an RDF graph from the SPARQL endpoint, the content of which is left to the endpoint to decide, based on what the maintainer deems as useful information.

Each of these query forms can be restricted by a WHERE block, which is optional in the case of the DESCRIBE query.

SPARQL 1.1 specifies a language for updating the database with several new query forms. A SPARQL query example that models the question "What are all the country capitals in Africa?" may be as follows:

```
PREFIX ex: <http://example.com/exampleOntology#>
SELECT ?capital
        ?country
WHERE
{
    ?x ex:cityname   ?capital ;
        ex:isCapitalOf ?y .
    ?y ex:countryname ?country ;
        ex:isInContinent ex:Africa .
}
```

Variables are indicated by a ? or $ prefix. Bindings for ?capital and the ?country will be returned. When a triple ends with a semicolon, the subject from this triple will implicitly complete the following pair to an entire triple. So for example ex:isCapitalOf ?y is short for ?x ex:isCapitalOf ?y.

The SPARQL query processor will search for sets of triples that match these four triple patterns, binding the variables in the query to the corresponding parts of each triple. Classes matching property oriented, i.e. can be conducted solely through class-attributes or properties (a.k.a. Duck typing, which is in computer programming is an application of the duck test—"If it walks like a duck and it quacks like a duck, then it must be a duck"—to determine if an object can be used for a particular purpose. With normal typing, suitability is determined by an object's type. In duck typing, an object's suitability is determined by the presence of certain methods and properties, rather than the type of the object itself).

To make queries concise, SPARQL allows the definition of prefixes and base URIs in a fashion similar to Turtle. Thus, the prefix "ex" stands for "http://example.com/exampleOntology#" in the above query.

https://en.wikipedia.org/wiki/SPARQL

The Web Ontology Language (OWL) is a family of knowledge representation languages for authoring ontologies. Ontologies are a formal way to describe taxonomies and classification networks, essentially defining the structure of knowledge for various domains: the nouns representing classes of objects and the verbs representing relations between the objects. Ontologies resemble class hierarchies in object-oriented programming but there are several critical differences. Class hierarchies are meant to represent structures used in source code that evolve fairly slowly (typically monthly revisions) whereas ontologies are meant to represent information on the Internet and are expected to be evolving almost constantly. Similarly, ontologies are typically far more flexible as they are meant to represent information on the Internet coming from all sorts of heterogeneous data sources. Class hierarchies on the other hand are meant to be fairly static and rely on far less diverse and more structured sources of data such as corporate databases. The OWL languages are characterized by formal semantics. They are built upon the World Wide Web Consortium's (W3C) XML, standard for objects, the Resource Description Framework (RDF). W3C announced a new version of OWL on 27 Oct. 2009, called OWL 2, which soon found its way into semantic editors such as Protégé and semantic reasoners such as Pellet, RacerPro, FaCT++ and HermiT. The OWL family contains many species, serializations, syntaxes and specifications with similar names. OWL and OWL2 are used to refer to the 2004 and 2009 specifications, respectively. Full species names will be used, including specification version (for example, OWL2 EL). When referring more generally, OWL Family can be used.

https://en.wikipedia.org/wiki/Web_Ontology_Language

A semantic reasoner, reasoning engine, rules engine, or simply a reasoner, is a piece of software able to infer logical consequences from a set of asserted facts or axioms. The notion of a semantic reasoner generalizes that of an inference engine, by providing a richer set of mechanisms to work with. The inference rules are commonly specified by means of an ontology language, and often a description logic language. Many reasoners use first-order predicate logic to perform reasoning; inference commonly proceeds by forward chaining and backward chaining. There are also examples of probabilistic reasoners, including non-axiomatic reasoning systems, and probabilistic logic networks. Examples for current semantic reasoners and related software are: Cyc inference engine, a forward and backward chaining inference engine with numerous specialized modules for high-order logic; KAON2, an infrastructure for managing OWL-DL, SWRL, and F-Logic ontologies; Cwm, a forward-chaining reasoner used for querying, checking, transforming and filtering information (its core language is RDF, extended to include rules, and it uses RDF/XML or N3 serializations as required); Drools, a forward-chaining inference-based rules engine which uses an enhanced implementation of the Rete algorithm; Flora-2, an object-oriented, rule-based knowledge-representation and reasoning system; Jena, an open-source semantic-web framework for Java which includes a number of different semantic-reasoning modules; Prova, a semantic-web rule engine which supports data integration via SPARQL queries and type systems (RDFS, OWL ontologies as type system).

https://en.wikipedia.org/wiki/Semantic_reasoner

Giant Global Graph (GGG) is a name coined in 2007 by Tim Berners-Lee to help distinguish between the nature and significance of the content on the existing World Wide Web and that of a promulgated next-generation web, presumptively named Web 3.0. Next-generation Web 3.0 information designs go beyond the discrete web pages of previous generations by emphasizing the metadata which describe information objects like web pages and attribute the relationships that conceptually or semantically link the information objects to each other. Additionally, Web 3.0 technologies and designs enable the organization of entirely new kinds of human- and machine-created data objects. The concept of the Semantic Web overlaps with Giant Global Graph without fully encompassing it. Social networking services are one of the earliest and best-known examples of this distinction. In a Social Network, the information about relationships between people, and the kinds of data objects those people share, is at least as important as the data objects themselves. Plus, participants in a Social Network create new kinds of data that did not exist on the web before, such as their Likes for other people's comments and content. Currently, these new kinds of data are primarily structured and mediated by the proprietary systems of companies like Facebook. In the ideal future of the decentralized Giant Global Graph or Semantic Web, such information would be structured in such a way that it could be readable by many different systems and dynamically organized into many different user-readable formats. The GGG concept also relates to the Decentralization of Internet Information, whereby properly formatted semantic web data objects can be organized and their relationships discerned by any computer on the Internet, rather than solely being organized by large centralized systems such as Facebook and Google. For instance, people using the FOAF protocol to organize information on websites or other Internet nodes can define and interact with their social networks without necessarily requiring the intervention of centralized systems like Facebook. Crucially, where the term Web 3.0 refers to a suite of technologies and to a particular phase in the development of the web, the term Giant Global Graph is intended to refer more generally to the total environment of information that will be generated and sustained through the implementation of these technologies. This environment will be a qualitatively different one than that which existed before the development of these technologies. As of 2017, anticipated progress toward a pervasive semantic web has been sidetracked by the widespread application of machine learning technologies to process existing, unstructured data and content, and that it is no longer clear whether a Web 3.0 epoch will materialize as originally envisioned.

https://en.wikipedia.org/wiki/Giant_Global_Graph

Machine Learning (ML) is the study of Computer algorithms improve automatically through experience. It is seen as a subset of artificial intelligence. Machine learning algorithms build, based on sample data, known as "training data", by e.g. modification of the internal structure of a neural network, a highly parallel computer system in order to make predictions or decisions without being explicitly programmed to do so. Machine learning algorithms are used in a wide variety of applications, such as email filtering and computer vision, where it is difficult or infeasible to develop conventional algorithms to perform the needed tasks. The discipline of machine learning employs various approaches to teach computers to accomplish tasks where no fully satisfactory algorithm is available. In cases where vast numbers of potential answers exist, one approach is to label some of the correct answers as valid. This can then be used as training data for the computer to improve the algorithm(s) it uses to determine correct answers. Machine learning approaches are traditionally divided into three broad categories, depending on the nature of the "signal" or "feedback" available to the learning system: 1) Supervised learning: The computer is presented with example inputs and their desired outputs, given by a "teacher", and the goal is to learn a general rule that maps inputs to outputs; 2) Unsupervised learning: No labels are given to the learning algorithm, leaving it on its own to find structure in its input. Unsupervised learning can be a goal in itself (discovering hidden patterns in data) or a means towards an end (feature learning); 3) Reinforcement learning: A computer program interacts with a dynamic environment in which it must perform a certain goal (such as driving a vehicle or playing a game against an opponent). As it navigates its problem space, the program is provided feedback that's analogous to rewards, which it tries to maximize. Other approaches have been developed which don't fit neatly into this three-fold categorization, and sometimes more than one is used by the same machine learning system. For example, topic modeling, dimensionality reduction or meta learning. More recently, deep learning has become an approach for much ongoing work in the field of machine learning.

https://en.wikipedia.org/wiki/Machine_learning

SUMMARY

An aspect relates to identifying a problem in the prior art and to finding a technical solution for this.

In connection with embodiments of the invention, unless otherwise stated in the description, the terms "perform", "calculate", "computer-aided", "calculate", "determine", "generate", "configure", "reconstruct" and the like relate, for example, to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smart phones, devices or any other communication devices that can process data with computer support, processors and other electronic devices for data processing. Computers can in particular comprise one or more processors and memory units.

A "processor" can be understood in connection with embodiments of the invention, for example, as a machine or an electronic circuit. A processor can in particular be a main processor (Central Processing Unit, CPU), a microprocessor or a microcontroller, for example an application-specific integrated circuit (ASIC) or a digital signal processor (DSP), possibly in combination with a memory unit for storage deal with program commands, etc. A processor can, for example, also be an IC (integrated circuit), in particular an FPGA (field programmable gate array) or an ASIC (application-specific integrated circuit), or a DSP (Digital Signal Processor) or a graphics processor GPU (Graphic Processing Unit). A processor can also be understood to mean a virtualized processor, a virtual machine or a soft CPU. It can also be a programmable processor, for example, which is equipped with configuration steps for executing the mentioned method according to embodiments of the invention or is configured with configuration steps in such a way that the programmable processor the features according to embodiments of the invention of the method, the component, the modules, or other aspects and/or partial aspects of embodiments of the invention realized.

In connection with embodiments of the invention, a "memory", "memory unit" or "memory module" and the like can mean, for example, a volatile memory in the form of random access memory (RAM) or a permanent memory such as a hard disk or a Disk.

In connection with embodiments of the invention, a "module" can be understood to mean, for example, a processor and/or a memory unit for storing program commands. For example, the processor is specially set up to execute the program commands in such a way that the processor executes functions in order to implement or realize the method, one step of the method, according to embodiments of the invention. A module can, for example, also be a node of a distributed system which, for example, implements the specific functions/features of a corresponding module. The respective modules can, for example, also be designed as separate or independent modules. For this purpose, the corresponding modules can include further elements. These elements may be, for example, one or more interfaces (e.g. database interfaces, communication interfaces—e.g. network interface, WLAN interface) and/or an evaluation unit (e.g. a processor) and/or a storage unit. For example, data can be exchanged (e.g. received, transmitted, sent or made available) by means of the interfaces. By means of the evaluation unit, data can be compared, checked, processed, assigned or calculated, for example with the aid of a computer and/or automated. By means of the storage unit, data can, for example, be stored, retrieved or made available in a computer-assisted and/or automated manner.

In connection with embodiments of the invention, "program code" or "code" can be understood to mean, for example, a program command or several program commands. Program code can in particular be executed and is executed, for example, by a computer or a processor. This can be implemented, for example, by means of an execution environment (e.g. a virtual machine), the execution environment or the program code, for example, being Turing-complete.

In connection with embodiments of the invention, "computer-aided" can be understood to mean, for example, an implementation of a method in which, in particular, a processor executes at least one method step of the method. For example, "computer-aided" also means "computer-implemented".

In connection with embodiments of the invention, "include", in particular with regard to data and/or information, can be understood to mean, for example, a (computer-aided) storage of corresponding information or a corresponding date in a data structure/data record, which in turn may be stored in a memory unit.

In connection with embodiments of the invention, "assign", in particular with regard to data and/or information, can be understood to mean, for example, a computer-aided assignment of data and/or information. For example, a second date is assigned to a first date by means of a memory address or a unique identifier (UID) by storing the first date together with the memory address or the unique identifier of the second date in a data record.

In connection with embodiments of the invention, "providing", in particular with regard to data and/or information, can be understood, for example, as computer-aided provision. The provision takes place, for example, via an interface (e.g. a database interface, a network interface, an interface to a storage unit). Corresponding data and/or information can, for example, be transmitted and/or sent and/or retrieved and/or received via this interface, when providing.

According to one finding of embodiments of the invention, knowledge graphs suffer from a content completeness problem. They may be completed or enriched with "implied" information; this task is also referenced to as inference. Knowledge graph completion/inference may be approached in one of two ways: knowledge-based completion and data-driven link prediction.

In knowledge-based completion, a set of pre-defined rules (which can be expressed as OWL axioms, SPIN rules, Datalog rules, or SPARQL Update queries, to name a few) are executed against the incomplete knowledge graph. This execution can be an inherent part of the graph database hosting the knowledge graph (typical for SPARQL) or may require an external component called reasoner (typical for OWL axioms and Datalog rules). Benefits of this approach include:

(1) given the rules are correct, only valid facts are added to the graph;
(2) the addition of triples is explainable (based on the rules); and
(3) especially for OWL, SPIN and SPARQL the application of rules is inherent part of most knowledge graph systems.

However, the rules need to be defined based on expert knowledge, which can be a tedious and costly process.

In link prediction, a machine learning model is used to propose new facts given properties of the existing (incomplete) graph. Typical examples include, for instance, methods for link prediction in graphs using tensors or random walks as used for relational recommender systems. The big benefit of data-driven knowledge graph completion is that no upfront definition of rules is required—new facts are added solely based on the actual data contained in the graph.

However, on the downside, purely data-driven approaches often fail to provide explanations for why a certain fact was added which are intelligible to the domain user. Also, from a deployment perspective, if such a completion approach shall be included in a classical RDF-based knowledge graph application, additional infrastructure for scoring the ML model is required.

One example illustrating this finding of embodiments of the invention is the currently well-known "Google Knowledge Graph" used by Google and its services to enhance its search engine's results with information gathered from a variety of sources. The information is presented to users in an infobox next to the search results, e.g. appearing to the right (top on mobile) of search results. These boxes are also known as knowledge panels. There is no official documentation of how the Google Knowledge Graph is implemented. It is providing answers without source attribution or citation.

Embodiments of the invention provide a technical solution for inference of knowledge graphs that combines data-driven completion (based on machine learning) with rule extraction in order to come up with declarative rules for knowledge completion.

One aspect of embodiments of the invention is to combine ML-based link prediction with SPARQL or SPARQL-like property chains and, more generally, SPARQL or SPARQL-like update queries for validation and execution.

The proposed solution can be run fully automated (e.g. based on thresholds), but in embodiments may be in an interactive setting where a user can validate proposed patterns based on domain criteria.

In one aspect, embodiments of the invention relate to a computer-implemented method for generation of completion rules for a knowledge graph which uses a machine learning model to produce a set of inferred triples from RDF data whereby the model is a generic one or (re-) trained, i.e. trained and/or retrained, on the graph or a subset of the graph; which generates completion rules with the same functionality as SPARQL queries of the form INSERT ?subject ?predicate ?object WHERE {triple_pattern_1. triple_pattern_2 . . . } by adding, as long as the pattern produces triples that are not part of the set, triple patterns that result in the exclusion of these triples, allowing to combine alternatives by either providing multiple SPARQL queries or combining their WHERE bodies with a UNION statement, stopping the generation once a pre-defined ratio of coverage of the set is reached or a user-defined execution time timeout is met; and which provides the resulting rules along with the inferred facts, i.e. those inferred triples covered by the rules, as candidates for completion of the graph.

With other words, embodiments of the invention relates to a computer-implemented method for generation of completion rules for a knowledge graph, comprising the following steps:
 Using a machine learning model to produce a set of inferred triples from RDF data whereby the model is a generic one or one that is trained and/or retrained on the graph or a subset of the graph;
 Generating completion rules with the same functionality as SPARQL queries of the form

```
INSERT ?subject ?predicate ?object
WHERE {
    triple_pattern_1 .
    triple_pattern_2 .
    ...
}
``` as follows:
 Adding to rules that would produce triples that are not part of the set triple patterns that result in the exclusion of these triples;
 Allowing to combine alternatives with a function corresponding to the OR-disjunction in inductive logic programming;
 Stopping the generation once a pre-defined ratio of coverage of the set is reached or a user-defined execution time timeout is met;
 Providing the resulting rules, in particular along with those inferred triples covered by the rules, as candidates for completion of the graph.

Alternatives can thereby in particular be combined by functionality corresponding to either providing multiple completion rules or combining WHERE bodies of rules with a UNION statement.

In another aspect of the computer-implemented method optionally one or more properties can be selected and in the absence of a selection all properties occurring in the data set are considered candidates for completion rule generation.

In another aspect of the computer-implemented method the set of inferred triples is optionally (post-) filtered, i.e. filtered and/or post-filtered, based on user settings.

In another aspect of the computer-implemented method the likelihood of a fact being true, as provided by the machine learning model, is used for the filtering by omitting all facts whose likelihood is below a pre-defined threshold.

In another aspect of the computer-implemented method elements with the same functionality as other elements of SPARQL WHERE clauses, such as FILTER statements, are learned.

In another aspect of the computer-implemented method in an optional post-processing step the WHERE statements can be refined by introducing property paths.

In another aspect of the computer-implemented method the two triple patterns {?x property1 ?y. ?y property2 ?z.} are replaced with the new triple pattern ?x property1/property2 ?z and/or whereby the two triple patterns {?x property1 ?y. ?z property2 ?y.} are replaced with the new triple pattern ?x property1/^property2 ?z.

In another aspect of the computer-implemented method those rules that have been approved by an expert on the knowledge domain, are applied on the RDF data.

In another aspect of the computer-implemented method after application of the approver rules on the RDF data the prediction machine learning model is re-trained on the resulting combined RDF data.

Embodiments of the invention furthermore relate to a computer program product (nontransitory computer readable storage medium having instructions, which when executed by a processor, perform actions) with program instructions for carrying out a method.

Moreover, embodiments of the invention relates to a provision device for the computer program product according to the preceding claim, wherein the provision device stores and/or provides the computer program product.

Benefits of embodiments of the invention are multifold:
 1. Validated: "Knowledge extraction" by user feedback results in knowledge with high reliance
 2. Explainability: Origin of Knowledge becomes expressly explainable which is also an enabler for user validation, in particular by using "rule-type" information which thereafter can be confirmed by a domain expert
 3. Simplicity: Part of the "standard" RDF stack at execution time, resulting in a simplified runtime deployment (RDF stack only) and reduced memory and runtime requirements
 4. Memory efficiency: No need to store large tensors
 5. Speed: Likely faster than scoring ML model Embodiments of the invention combine thereby a number of beneficial properties:
 (1) The rule-like representation is an enabler for a user review of the completion logic. This is harder in purely data-driven approaches and if done must be done on concrete facts rather than rules, thereby increasing effort.
 (2) The rule-like representation of completion logic allows for explainable completion of the graph.
 (3) The explainability also allows for efficient user feedback and validation.
 (4) As the rules are using formalisms of the W3C semantic web stack, no machine learning environment is required at runtime, resulting in simpler systems with smaller footprint.
 (5) This leads to more memory-efficient systems.
 (6) Also, runtime performance can be increased by avoiding scoring of ML models (which can still be costly).
 (7) Completion rules are learned from data rather than specified manually.
 (8) Completion rules can also be generated in face of incomplete/contradictory data.

(1) to (6) are missing or much harder in data-driven approaches, whereas (7) and (8) often miss in purely knowledge-based approaches.

In embodiments, the proposed technology may be applied to building technology whereby machine learning can discover complex dependencies between different aspects of a building, such as effects of building structure on choice of building automation products, improving sales. Being able to bring these rules into an intelligible format helps domain experts assess their validity & execute them against actual twins of buildings without the need for specific ML infrastructure Alternatively, the proposed technology may be applied on the technical field of building optimization whereby machine learning can discover complex dependencies between building structure, choice and configuration of building automation products, and building "climate" (represented by measurement data of sensors) which can be used for control e.g. of HVAC systems. In this technical field intelligible compact rules would be an important asset.

Furthermore, the proposed technology can be offered as part of a Knowledge Graph Toolkit, thereby enriching the Toolkit with a Unique Selling Point other offerings on the market.

Moreover, the proposed technology can be applied for graph-based machine learning where resources are typically scarce especially in edge scenarios. Not requiring dedicated machine learning systems for scoring can be an advantage in this field of technology.

The described applications of the proposed technology are intended to show, by way of example only, some ways how an application of the proposed technology could look like. Consequently, the application of the proposed technology is not restricted to the exemplary applications, but it may be applied in general on any other field.

BRIEF DESCRIPTION

Figure 2:
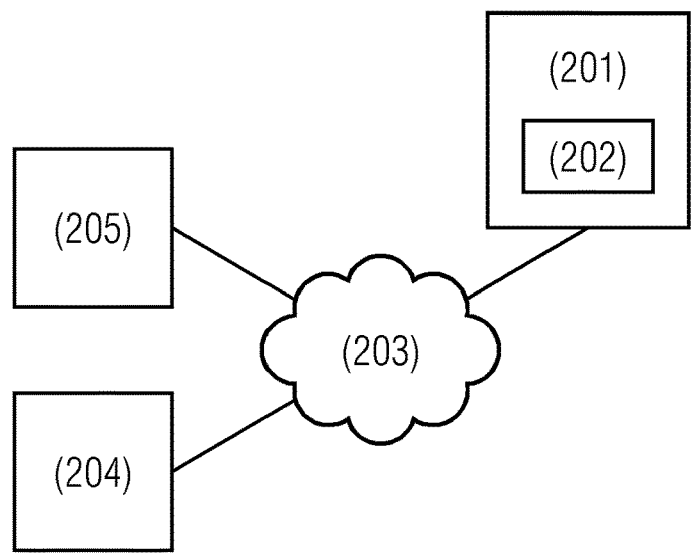
Figure 3:
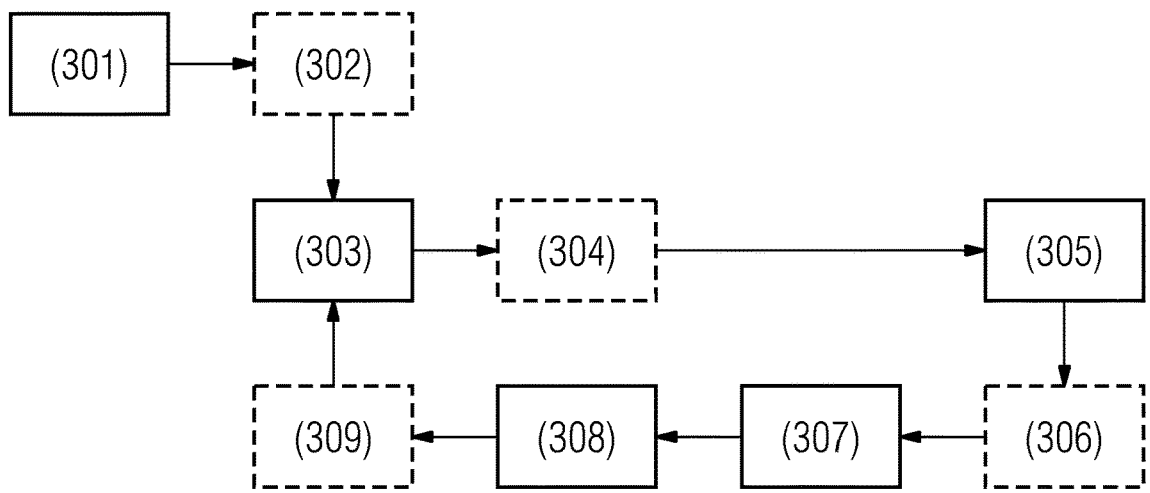

Some of the embodiments will be described in detail, with reference to the following figures, wherein like designations denote like members, wherein:

FIG. 1 shows a first embodiment;
FIG. 2 shows another embodiment; and
FIG. 3 shows another embodiment.

In the figures, functionally identical elements are provided with the same reference symbols, unless otherwise stated.

DETAILED DESCRIPTION

Unless otherwise stated or already stated, the following exemplary embodiments have at least one processor and/or a memory unit in order to implement or execute the method.

In particular, a person skilled in the art is of course familiar with all of the options for realizing products or options for implementation that are customary in the prior art, so that there is no need for an independent disclosure in the description. In particular, these customary implementation variants known to those skilled in the art can be implemented exclusively by hardware (components) or exclusively by software (components). Alternatively and/or additionally, the person skilled in the art can, within the scope of his professional ability, choose as far as possible any combination of hardware (components) and software (components) according to embodiments of the invention in order to realize implementation variants according to embodiments of to the invention.

A combination of hardware (components) and software (components) according to embodiments of the invention can occur, in particular, if some of the effects according to embodiments of the invention are exclusively implemented by special hardware (e.g. a processor in the form of an ASIC or FPGA) and/or some other part by the (processor and/or memory-based) software.

In particular, in view of the large number of different implementation options, it is impossible and also not expedient or necessary for understanding embodiments of the invention to name all these implementation options. In this respect, all of the following exemplary embodiments are intended to show, by way of example only, some ways how such implementations of the teaching according to embodiments of the invention could look like. Consequently, the features of the individual exemplary embodiments are in particular not restricted to the respective exemplary embodiment but relate to embodiments of the invention in general. Correspondingly, in embodiments features of one exemplary embodiment can also serve as features for another exemplary embodiment, in particular without this having to be explicitly mentioned in the respective exemplary embodiment.

FIG. 1 shows one sample structure for computer-implementation of embodiments of the invention which comprises:
(101) computer system
(102) processor
(103) memory
(104) computer program (product)
(105) user interface In this embodiment of the invention the computer program product 104 comprises program instructions for carrying out embodiments of the invention. The computer program 104 is stored in the memory 103 which renders, among others, the memory and/or its related computer system 101 a provisioning device for the computer program product 104. The system 101 may carry out embodiments of the invention by executing the program instructions of the computer program 104 by the processor 102. Results of embodiments of the invention may be presented on the user interface 105. Alternatively, they may be stored in the memory 103 or on another suitable means for storing data.

FIG. 2 shows another sample structure for computer-implementation of embodiments of the invention which comprises:
(201) provisioning device
(202) computer program (product)
(203) computer network/Internet
(204) computer system
(205) mobile device/smartphone In this embodiment the provisioning device 201 stores a computer program 202 which comprises program instructions for carrying out embodiments of the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

FIG. 3 illustrates, by way of example, another embodiment of the invention. The boxes are thereby representations of the following actions:
(301) Load graph (RDF)
(302) Select target properties
(303) Predict links
(304) Filter predictions
(305) Induce query patterns (306) Postprocess: Property Paths
(307) User Validation
(308) Materialize
(309) Update prediction model In particular dotted boxes can thereby optionally be in- or excluded from this embodiment.

In more detail, embodiments of the invention are carried out as follows in this embodiment, whereby SPARQL is use for illustration of embodiments of the invention, while of course any other language with same functionality could alternatively be used, and for better understanding the explanation of each step is supplemented by a specific example based on a small representative exemplary set of data which alternatively and interchangeably can also be called facts or triples:

(301) Initially, RDF data is available or may be loaded by the user prior to start of the computer-implemented embodiments of the invention.

By way of example, the RDF data shall include, but not be limited to
p1 a Product; hasComponent s1.
s1 a PowerSupply; hasVoltage "220V".
p2 a Product; hasComponent s2; supportsVoltage "220V".
s2 a PowerSupply; hasVoltage "220V".
(and many more similarly shaped product descriptions)

(302) Optionally, the user can then select one or more properties for which he would like to get completion rules. If no property is selected, all properties occurring in the data set are considered candidates for completion rule generation.

(303) Next, a machine learning model is used to produce inferred triples. This model can either be a generic one (especially if the graph is small) or be (re-)trained on a subset of the graph at hand.

In the example, inferred triples may include, but not limited to
p1 supportsVoltage "220V". (95%)
p1 a EUProduct. (70%)
p1 a USProduct. (35%)

(304) Based on user settings, the set of predicted triples may be post-filtered. A typical approach would be to use the likelihood of the fact being true as provided by the ML model in step 303 for this filtering by omitting all facts whose likelihood is below a (user-defined) threshold.

Assuming in the example that a threshold of >66% is set for acceptance, the following triples would remain:
p1 supportsVoltage "220V". (95%)
p1 a EUProduct. (70%)

(305) Next, so-called triple patterns are induced using an approach similar to inductive logic programming (ILP). Basically, this process tries to "learn" SPARQL queries of the form

```
INSERT ?subject ?predicate ?object
WHERE {
triple_pattern_1 .
triple_pattern_2 .
...
}
```

The way this learning method works (analogously to ILP) is as follows:

As long as the pattern is too generic (that is, it would also produce triples that are not part of the post-filtered prediction set from step 304), the algorithm adds triple patterns that result in the exclusion of these triples (note that triple patterns are combined using AND).

Corresponding to the OR-disjunction in ILP, the proposed algorithm allows to combine alternatives (and thereby increase its coverage of the set from step 304 by either providing multiple SPARQL queries or, alternatively, combining their WHERE bodies with a UNION statement.

The generation approach stops once a user-defined ratio of coverage of the set from step 304 is reached or, alternatively, a user-defined execution time timeout is met.

This basic approach can also be extended to learn other elements of SPARQL WHERE clauses, such as FILTER statements.

In the example, this would lead to two pattern candidates:

```
INSERT ?p supportsVoltage ?v
WHERE {
    ?p hasComponent ?c .
    ?c hasVoltage ?v .
}
INSERT ?p a ?EUProduct
WHERE {
    ?p hasComponent ?c .
    ?c a PowerSupply ; hasVoltage "220V" .
}
```

(306) In an optional post-processing step, the WHERE statements can be refined (and made easier to read) by introducing so-called property paths. This is a syntactic transformation which, for instance,

```
replaces the two triple patterns
    {?x property1 ?y. ?y property2 ?z.}
with the new triple pattern
    ?x property1/property2 ?z
or replaces the two triple patterns
    {?x property1 ?y. ?z property2 ?y.}
with the new triple pattern
    ?x property1/^property2 ?z.
```

In the example this would yield to the following more compact representations:

```
INSERT ?p supportsVoltage ?v
WHERE {
    ?p hasComponent / hasVoltage ?v .
}
INSERT ?p a ?EUProduct
WHERE {
    ?p hasComponent [a PowerSupply; hasVoltage "220V"] .
}
```

(307) These rules, represented in this embodiment by way of example as SPARQL queries, provide a transparent and well-structured explanation and/or documentation of any completion of the graph that would result from their application to the graph. By that the technical problem recognized by embodiments of the invention is solved by the provided computer-implemented rule generation. Apart from using the generated rules for purposes like explanation and/or documentation of the knowledge graph completion resulting from their application to the graph, the machine-generated completion rules can now, prior to their application, optionally be presented to an expert who understands the domain for his evaluation, and support his work that could for example be domain-specific filtering or approval of certain machine-generated completion rules. To further simplify the evaluation, along with the role the UI can in addition display the inferred facts/triples covered by this rule. Due to the compact representation as a rule, an expert review is easier here than in a data-driven setting.

In the example, the user decides to not keep the second rule, resulting in:

```
INSERT ?p supportsVoltage ?v
WHERE {
    ?p hasComponent / hasVoltage ?v .
}
```

This rule may be presented, e.g. on a display, along with at least the induced fact p1 supportsVoltage "220V".

(308) Thereafter the machine-generated (and potentially expert-validated) rules can be materialized, for example by executing the (confirmed/approved) rules on the initial RDF data and thereby completing the knowledge graph.

In the example this results in extending the knowledge graph with p1 supportsVoltage "220V".

(309) It is possible to extend the proposed approach to an iterative setting by applying the approved rules on the data loaded in step 301, and re-training the prediction model on the combined data, taking into account the new fact(s).

As an optional extension, also information about rejected rules as negative examples for training may be kept.

The embodiment shown in FIG. 3 can be implemented with a structure as shown in FIG. 1 or FIG. 2.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for generation of completion rules for a knowledge graph, comprising the following steps:
   using a machine learning model to produce a set of inferred triples from RDF data, wherein the model is a generic model or a model trained and/or retrained on the knowledge graph or a subset of the knowledge graph;
   generating completion rules with a same functionality as SPARQL queries of the form

```
INSERT ?subject ?predicate ?object
WHERE {
    triple_pattern_1 .
    triple_pattern_2 .
    ...
}
``` as follows:
   adding to completion rules, that would produce triples that are not part of the set, triple patterns that result in the exclusion of these triples;
   allowing to combine alternatives with a function corresponding to OR-disjunction in inductive logic programming;
   stopping the generating once a pre-defined ratio of coverage of the set is reached or a user-defined execution time timeout is met; and
   providing the resulting completion rules as candidates for completion of the knowledge graph;
   wherein the two triple patterns

```
{?x property1 ?y. ?y property2 ?z.}
are replaced with the new triple pattern
    ?x property1/property2 ?z
and / or whereby the two triple patterns
{?x property1 ?y. ?z property2 ?y.}
are replaced with the new triple pattern
    ?x property1/^property2 ?z.
```

2. The method according to claim 1, wherein one or more properties are selected or in the absence of a selection all properties occurring are considered candidates for completion rule generation.

3. The method according to claim 1, wherein the set of inferred triples is optionally filtered and/or post-filtered based on user settings.

4. The method according to claim 3, wherein the likelihood of an inferred triple being true, as provided by the machine learning model, is used for the filtering by omitting all inferred triples whose likelihood is below a pre-defined threshold.

5. The method according to claim 1, wherein elements with a same functionality as other elements of SPARQL WHERE clauses, such as FILTER statements, are learned.

6. The method according to claim 1, wherein rules that have been approved by an expert on the knowledge domain, are applied on the RDF data.

7. The method according to claim 6, wherein the prediction machine learning model is re-trained on the resulting combined RDF data.

8. The method according to claim 1, wherein inferred triples that are covered by resulting rules are provided along with the resulting rules, and/or wherein a function corresponding to OR-disjunction is either providing multiple completion rules or combining WHERE bodies of rules with a UNION statement.

9. The method according to claim 1, wherein resulting rules are provided as candidates for completion of the knowledge graph to an expert on the knowledge domain for evaluation.

10. A computer program product, comprising a computer readable hardware storage device having computer readable program code stored therein, said program code comprising program instructions that cause, when the program is executed by a computer, the computer to carry out the method according to claim 1.

11. A computer-implemented method for generation of completion rules for a knowledge graph, comprising the following steps:
    using a machine learning model to produce a set of inferred triples from RDF data, wherein the model is a generic model or a model trained and/or retrained on the knowledge graph or a subset of the knowledge graph;
    generating completion rules with a same functionality as SPARQL queries of the form

```
INSERT ?subject ?predicate ?object
WHERE
{
   triple_pattern_1 .
   triple_pattern_2 .
   ...
}
``` as follows:

adding to completion rules, that would produce triples that are not part of the set, triple patterns that result in the exclusion of these triples;

allowing to combine alternatives with a function corresponding to OR-disjunction in inductive logic programming;

stopping the generating once a pre-defined ratio of coverage of the set is reached or a user-defined execution time timeout is met; and providing the resulting completion rules as candidates for completion of the knowledge graph; wherein rules that have been approved by an expert on the knowledge domain are applied on the RDF data; and wherein the prediction machine learning model is re-trained on the resulting combined RDF data.

12. The method according to claim 11, wherein one or more properties are selected or in the absence of a selection all properties occurring are considered candidates for completion rule generation.

13. The method according to claim 11, wherein the set of inferred triples is optionally filtered and/or post-filtered based on user settings.

14. The method according to claim 11, wherein the likelihood of an inferred triple being true, as provided by the machine learning model, is used for the filtering by omitting all inferred triples whose likelihood is below a pre-defined threshold.

15. The method according to claim 11, wherein elements with a same functionality as other elements of SPARQL WHERE clauses, such as FILTER statements, are learned.

16. The method according to claim 11, wherein in an optional post-processing step the WHERE statements are refined by introducing property paths and/or wherein the two triple patterns

```
{?x property1 ?y. ?y property2 ?z.}
are replaced with the new triple pattern
   ?x property1/property2 ?z
and / or wherein the two triple patterns
{?x property1 ?y. ?z property2 ?y.}
are replaced with the new triple pattern
   ?x property1/^property2 ?z .
```

17. The method according to claim 11, wherein inferred triples that are covered by resulting rules are provided along with the resulting rules.

18. The method according to claim 11, wherein a function corresponding to OR-disjunction is either providing multiple completion rules or combining WHERE bodies of rules with a UNION statement.

19. A computer program product, comprising a computer readable hardware storage device having computer readable program code stored therein, said program code comprising program instructions that cause, when the program is executed by a computer, the computer to carry out the method according to claim 11.

20. A computer-implemented method for generation of completion rules for a knowledge graph, comprising the following steps:

using a machine learning model to produce a set of inferred triples from RDF data, wherein the model is a generic model or a model trained and/or retrained on the knowledge graph or a subset of the knowledge graph;

generating completion rules with a same functionality as SPARQL queries of the form

```
INSERT ?subject ?predicate ?object
WHERE {
   triple_pattern 1 .
   triple_pattern 2 .
   ...
}
``` as follows:

adding to completion rules, that would produce triples that are not part of the set, triple patterns that result in the exclusion of these triples;

allowing to combine alternatives with a function corresponding to OR-disjunction in inductive logic programming;

stopping the generating once a pre-defined ratio of coverage of the set is reached or a user-defined execution time timeout is met; and providing the resulting completion rules as candidates for completion of the knowledge graph; wherein in an optional post-processing step the WHERE statements are refined by introducing property paths; and wherein the two triple patterns

```
{?x property1 ?y. ?y property2 ?z.}
are replaced with the new triple pattern
   ?x property1/property2 ?z
and / or wherein the two triple patterns
{?x property1 ?y. ?z property2 ?y.}
are replaced with the new triple pattern
   ?x property1/^property2 ?z.
```

* * * * *